United States Patent
Lin

(10) Patent No.: US 12,120,676 B2
(45) Date of Patent: Oct. 15, 2024

(54) DATA TRANSMISSION METHOD AND DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/926,563

(22) Filed: Jul. 10, 2020

(65) Prior Publication Data

US 2020/0344785 A1    Oct. 29, 2020

Related U.S. Application Data

(63) Continuation of application No. PCT/CN2018/072479, filed on Jan. 12, 2018.

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0051* (2013.01); *H04L 5/10* (2013.01); *H04L 27/0008* (2013.01); *H04W 72/0446* (2013.01); *H04W 72/0453* (2013.01); *H04W 72/0473* (2013.01); *H04W 72/21* (2023.01)

(58) Field of Classification Search
CPC ......... H04W 72/1273; H04W 72/0413; H04W 72/0446; H04W 72/0453; H04W 72/0473; H04W 72/1268; H04L 5/0051; H04L 5/10; H04L 27/0008; H04L 5/0044
See application file for complete search history.

(56) References Cited

U.S. PATENT DOCUMENTS

2010/0067535 A1    3/2010  Ma et al.
2012/0320860 A1*  12/2012  Chun ............... H04L 5/003
                                                    370/329
(Continued)

FOREIGN PATENT DOCUMENTS

AU    2016292598 A1    12/2017
CN      103053213 A     4/2013
(Continued)

OTHER PUBLICATIONS

WO2017010477-A1 "User Terminal, Wireless Base Station and Wireless Communication Method", Takeda Kazuki et al. Jan. 19, 2017. Espacenet translation. (Year: 2017).*
(Continued)

*Primary Examiner* — Huy D Vu
*Assistant Examiner* — Robert Ma
(74) *Attorney, Agent, or Firm* — BAYES PLLC

(57) ABSTRACT

A data transmission method includes receiving, by a terminal, at least two pieces of scheduling information from a network device. At least two transmission resources correspond to the at least two pieces of scheduling information partially overlap in time domain. The data transmission method also includes performing data transmission on at least one of the at least two transmission resources.

11 Claims, 4 Drawing Sheets

(51) Int. Cl.
    *H04L 5/10*         (2006.01)
    *H04L 27/00*       (2006.01)
    *H04W 72/044*     (2023.01)
    *H04W 72/0446*    (2023.01)
    *H04W 72/0453*    (2023.01)
    *H04W 72/1273*    (2023.01)
    *H04W 72/21*      (2023.01)

(56) References Cited

U.S. PATENT DOCUMENTS

| | | | | |
|---|---|---|---|---|
| 2014/0050205 A1* | 2/2014 | Ahn | H04W 52/367 |
| | | | 370/336 |
| 2017/0359807 A1* | 12/2017 | Hong | H04W 72/23 |
| 2018/0076937 A1* | 3/2018 | Nasiri Khormuji | H04L 5/0073 |
| 2018/0176937 A1* | 6/2018 | Chen | H04W 72/21 |
| 2018/0199314 A1* | 7/2018 | Takeda | H04L 1/1822 |
| 2019/0190645 A1* | 6/2019 | Sano | H04L 1/0009 |
| 2019/0327757 A1* | 10/2019 | Oteri | H04L 5/0053 |

FOREIGN PATENT DOCUMENTS

| | | |
|---|---|---|
| CN | 103391583 A | 11/2013 |
| CN | 104052704 A | 9/2014 |
| CN | 104126328 A | 10/2014 |
| CN | 104640211 A | 5/2015 |
| CN | 106254047 A | 12/2016 |
| CN | 106357579 A | 1/2017 |
| CN | 107079463 A | 8/2017 |
| CN | 107431590 A | 12/2017 |
| EP | 2209272 A1 | 7/2010 |
| JP | 2019510441 A | 4/2019 |
| WO | 2016089185 A1 | 6/2016 |
| WO | 2017010477 A1 | 1/2017 |
| WO | 2017173177 A1 | 10/2017 |

OTHER PUBLICATIONS

3GPP TSG RAN WG1 Meeting #87, R1-1611657, "UL URLLC Multiplexing Considerations", Nov. 14, 2016, Section 2: Coexistence of eMBB/URLLC in UL (Year: 2016).*
3GPP TSG RAN WG1 Meeting #88bis R1-1705787, "On MUST eMBB and URLCC multiplexing in uplink", Apr. 3-7, 2017, Section 3. Superposition of eMBB and URLLC (Year: 2017).*
3GPP TSG RAN WG1 Meeting #89, R1-1708065, "Power Control for Transmissions with Different Numerologies", May 19, 2017, Section 2.2: Power Control for eMBB and URLLC, Option 1 and 2. (Year: 2017).*
Communication pursuant to Article 94(3) EPC issued in corresponding European Application No. 18899705.0, mailed Jul. 14, 2021, 9 pages.
International Application No. PCT/CN2018/072479, International search report, mailed on Sep. 21, 2018, 4 pages.
Supplemental European Search Report issued in corresponding European Patent Application No. EP 18 89 9705, mailed on Oct. 30, 2020, 11 pages.
"UL URLLC Multiplexing Considerations", Agenda Item: 7.1.4.4., Source: Huawei, HiSilicon, 3GPP TSG RAN WG1 Meeting #87, R1-1611657, Reno, USA, Nov. 14-18, 2016, 6 pages.
"Partial preemption-based multiplexing for eMBB and URLLC in DL", Agenda item: 8.1.3.3.7, Source: Samsung, 3GPP TSG RAN WG1 Meeting #88bis, R1-1706133, Spokane, USA, Apr. 3-7, 2017, 5 pages.
"On MUST eMBB and URLLC multiplexing in uplink", Agenda item: 8.1.3.3.6 eMBB/URLLC multiplexing for uplink, Source: Institute for Information Industry (III), 3GPP TSG-RAN WG1 Meeting #88bis, R1-1705787, Spokane, USA Apr. 3-7, 2017, 5 pages.
Notice of Reasons for Refusal issued in corresponding Japanese Application No. 2020-538553, mailed Jan. 4, 2022, 10 pages.
Communication pursuant to Article 94(3) EPC issued in corresponding European Application No. 18899705.0, mailed Feb. 2, 2022, 10 pages.
"On Intra-UE UL Puncturing", Agenda Item: 8.1.3.3.6, Source: Ericsson, 3GPP TSG-RAN WG1 #88bis R1-1706056, Spokane, USA, Apr. 3-7, 2017, 2 pages.
Priority Review issued in corresponding Chinese Application No. 202110207471.X, mailed Jun. 28, 2022, 6 pages.
First Office Action issued in corresponding Korean Application No. 10-2020-7023108, mailed Jul. 13, 2022, 8 pages.
"Discussion on URLLC support in NR", R1-166759, Source: Samsung, 3GPP TSG RAN WG1 Meeting #86, Gothenburg, Sweden, Aug. 22-26, 2016, 5 pages.
Notice of Allowance issued in corresponding Chinese Application No. 202110207471.X, mailed Jul. 29, 2022.
Third Office Action issued in corresponding European Application No. 18899705.0, mailed Aug. 2, 2022.
Decision of Rejection issued in corresponding Japanese Application No. 2020-538553, mailed Aug. 5, 2022.
Huawei et al., "DL URLLC multiplexing considerations", R1-1611222, 3GPP TSG RAN WG 1 Meeting #87 Reno, USA Nov. 14-18, 2016.
Intel Corporation, "Discussion on Time Resource Pattern of Transmission", R1-150235, 3GPP TSG RAN WG1 Meeting #80 Athens, Greece, Feb. 9-13, 2015.
Li Jiaojun, etc., "A Sub-Carrier Allocation Algorithm in the Multi-Carrier System", Journal of Southwest University (Natural Science Edition), vol. 34 No. 7, Release Date: Jul. 20, 2012.
Min Minghui, etc., "Research on Multi-slot Frame Scheduling Algorithm in Industrial IoT Applications", Computer Engineering vol. 42 No. 11, Release Date: Nov. 15, 2016.
Samsung, "Power Control for Transmissions with Different Numerologies", R1-1708065, 3GPP TSG RAN WG1 Meeting #89 Hangzhou, China May 15-19, 2017.
Reconsideration Examination Report issued in corresponding Japanese Application No. 2020-538553, mailed Jan. 5, 2023.
Decision of Final Rejection issued in corresponding Korean Application No. 10-2020-7023108, mailed Jan. 17, 2023.
Fourth Office Action issued in corresponding European Application No. 18899705.0, mailed Feb. 9, 2023.
Second Decision of Rejection issued in corresponding Korean Application No. 10-2020-7023108, mailed May 18, 2023.
Notice of Allowance issued in corresponding Japanese Application No. 2020-538553, mailed Jun. 13, 2023.
Fifth Office Action issued in corresponding European Application No. 18899705.0, mailed Jul. 5, 2023.

\* cited by examiner

DATA TRANSMISSION METHOD AND DEVICE

CROSS-REFERENCE TO RELATED APPLICATIONS

This application is continuation of International Application No. PCT/CN2018/072479, filed on Jan. 12, 2018, which is hereby incorporated by reference in its entirety.

BACKGROUND

The present application relates to the field of data transmission technology, and in particular, to a data transmission method and device.

In New Radio (NR) system such as 5G applications, there are three main service scenarios, one is Enhanced Mobile Broadband (eMBB) service, another is Ultra Reliable and Low Latency Communication (URLLC) service, and the other is massive machine type of communication (mMTC). The terminal can perform transmission of the data of these services on the configured transmission resources according to the service requirements.

In the actual application process, two or more transmission resources may partially overlap with each other at the terminal. Therefore, it is urgent to provide a data transmission method for performing transmission of two or more types of data when some transmission resources conflict in the time domain at the terminal.

SUMMARY

Aspects of the application provide a data transmission method and device, so as to perform data transmission when partial transmission resources corresponding to two or more types of data conflict in the time domain at the terminal.

According to an aspect of the application, there is provided a data transmission method, including performing transmission of at least two pieces of scheduling information; at least two transmission resources corresponding to the at least two pieces of scheduling information partially overlap in time domain; and performing data transmission on at least one of the at least two transmission resources.

According to another aspect of the application, there is provided a data transmission device, including a scheduling transmission unit, configured to perform transmission of at least two pieces of scheduling information; at least two transmission resources corresponding to the at least two pieces of scheduling information partially overlap in time domain; and a data transmission unit, configured to perform data transmission on at least one of the at least two transmission resources.

As can be known from the foregoing technical solution, transmission of at least two pieces of scheduling information are performed in an embodiment of the present application, and at least two transmission resources corresponding to the at least two pieces of scheduling information partially overlap in time domain, so that data transmission can be performed on at least one of the at least two transmission resources, thereby realizing data transmission when partial transmission resources corresponding to two or more types of data conflict in the time domain at the terminal.

BRIEF DESCRIPTION OF THE DRAWINGS

In order to more clearly explain the technical solutions in the embodiments of the present application, the following will briefly introduce the drawings required in the embodiments or the description of the prior art. Apparently, the drawings in the following description corresponding to some embodiments of the present application. For those of ordinary skill in the art, other drawings may be obtained based on these drawings without paying creative labor.

DETAILED DESCRIPTION

To make the objectives, technical solutions, and advantages of the embodiments of the present application clearer, the technical solutions in the embodiments of the present application will be described clearly and completely in conjunction with the drawings in the embodiments of the present application. Obviously, the described embodiments are only a part of the embodiments of the present application, but not all the embodiments. Based on the embodiments of the present application, all other embodiments obtained by a person of ordinary skill in the art without creative work fall within the protection scope of the present application.

The term "and/or" in this disclosure is just an association relationship that describes an associated object, indicating that there may be three relationships. For example, "A and/or B" may refer to three cases: A exists alone, A and B exist at the same time, or B exists alone. In addition, the character "/" in this disclosure generally indicates that the related objects before and after it are in an "or" relationship.

Figure 1A:
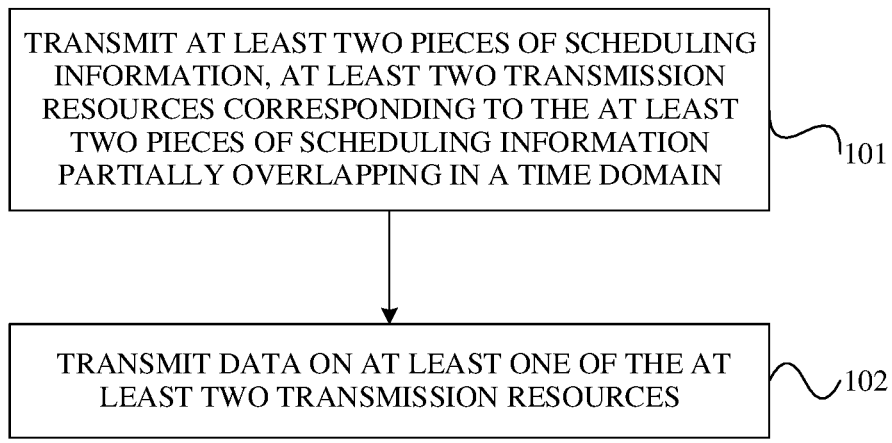
FIG. 1A is a schematic flowchart illustrating of a data transmission method according to an embodiment of the present application.

As shown in FIG. 1A, it is a schematic flowchart illustrating of a data transmission method according to an embodiment of the present application.

In 101, the transmission of at least two pieces of scheduling information are performed; at least two transmission resources corresponding to the at least two pieces of scheduling information partially overlap in time domain.

In an embodiment, the transmission resource includes, but not limited to, at least one of a time domain resource, a frequency domain resource, and a power domain resource. The embodiment is not limited thereto.

In 101, data transmission is performed on at least one of the at least two transmission resources.

It should be noted that the execution subject of 101 and 102 may be a terminal, or may also be a network device, which is not particularly limited in this embodiment.

In the application, the transmitted data refers to information that needs to be transmitted between the terminal and the network device and may be carried on a physical uplink channel. In an embodiment, the physical uplink channel may include, but is not limited to, at least one of a physical uplink shared channel (PUSCH) and a physical uplink control channel (PUCCH).

The technical solution proposed in the application may be applied in New Radio (NR) system, such as 5G applications. There are three main service scenarios in NR system, one is Enhanced Mobile Broadband (eMBB) service, another is Ultra Reliable and Low Latency Communication (URLLC) service, and the other is massive machine type of communication (mMTC). The terminal can perform data transmission of these services on the configured transmission resources according to the service requirements. Accordingly, the transmitted data as involved herein may include, but not limited to, at lease two types of eMBB data, URLLC data, and mMTC data. The embodiment is not limited thereto.

Optionally, in a possible implementation manner of this embodiment, in 101, the transmitted scheduling information may be dynamic scheduling information, or may also be semi-static scheduling information, which is not particularly limited in this embodiment.

Optionally, in a possible implementation manner of this embodiment, in 102, the transmission of the first data may be specifically performed on a first transmission resource corresponding to the at least two pieces of scheduling information.

In this implementation manner, the transmitted data may further include second data in addition to the first data. In an embodiment, a service priority of the first data is greater than or equal to a service priority of the second data.

For example, in the New Radio (NR) system such as the 5G application, the priority of URLLC data is greater than the priority of eMBB data; the priority of eMBB data is greater than the priority of mMTC data.

In a specific implementation manner, it is further possible to perform no data transmission on a first partial resource of a second transmission resource corresponding to the at least two pieces of scheduling information, and perform transmission of the second data on the second partial resource of the second transmission resource.

In an embodiment, the first partial resource may include, but not limited to, all or part of resource in the second transmission resource that overlaps with the first transmission resource in time domain; the second partial resource may include, but not limited to, all or part of resource in the second transmission resource that does not overlap with the first transmission resource in time domain.

For example, the transmission of the second data is performed on all of the second partial resource when the all of the second partial resource has corresponding demodulation pilot.

In this way, when the demodulation pilot can demodulate the data, the available transmission resources are used for data transmission as much as possible, thereby effectively improving the system efficiency.

Optionally, for another example, the transmission of the second data is performed on part of the second partial resource when the part of the second partial resource has corresponding demodulation pilot.

In this way, when the demodulation pilot can demodulate the data, the available transmission resources are used for data transmission as much as possible, thereby effectively improving the system efficiency.

Optionally, for another example, no data transmission is performed on part of the second partial resource when the part of the second partial resource does not have corresponding demodulation pilot.

In this way, meaningless transmission can be avoided, thereby effectively reducing system interference.

Optionally, for another example, no data transmission is performed on all of the second partial resource when the all of the second partial resource does not have corresponding demodulation pilot.

In this way, meaningless transmission can be avoided, thereby effectively reducing system interference.

In these examples, it can be specifically determined whether the second transmission resource includes demodulation pilots capable of demodulating the data transmitted on all or part of the second partial resource. If the second transmission resource includes the demodulation pilots capable of demodulating the data transmitted on all or part of the second partial resource, then all or part of the second resource has corresponding demodulation pilot. If the second transmission resource includes the demodulation pilots capable of demodulating the data transmitted on all or part of the second partial resource, then all or part of the second partial resource does not have corresponding demodulation pilot.

To make the method provided by the embodiments of the present application clearer, the following will take an example in which transmission resources of URLLC data and eMBB data partially overlap.

After determining that the transmission resources of two types of data corresponding to the scheduling information, that is, the URLLC data and the eMBB data partially overlap in the time domain, since the priority of the URLLC data is greater than the priority of the eMBB data, no data transmission is performed on the first partial resource of the second transmission resource overlapping with the first transmission resource in the time domain, and transmission of the eMBB data is performed on the second partial resource of the second transmission resource overlapping with the first transmission resource in the time domain.

There are many ways on how to perform transmission of the eMBB data on the second partial resource of the second transmission resource. Several examples will be given below.

Figure 1B:
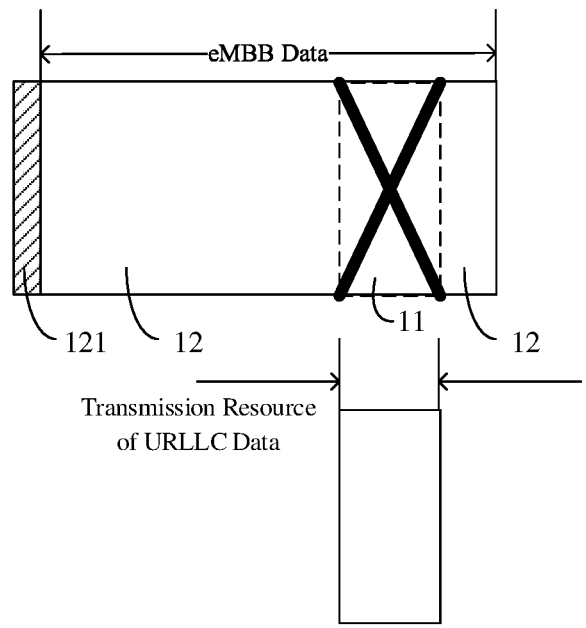
FIG. 1B is a schematic diagram illustrating a transmission resource provided by the embodiment corresponding to FIG. 1A.

As shown in FIG. 1B, assuming that the second data is eMBB data, the eMBB data includes one column of demodulation pilots 121 (as shown by the shaded part in the figure). The first column of pilots 121 is on the second partial resource 12, indicating that all of the second partial resource 12 has corresponding demodulation pilot. Therefore, no data transmission is to be performed on the overlapping first partial resource 11 (as shown by X in the figure), and transmission of eMBB data is performed on all of the non-overlapping second partial resource 12.

Figure 1C:
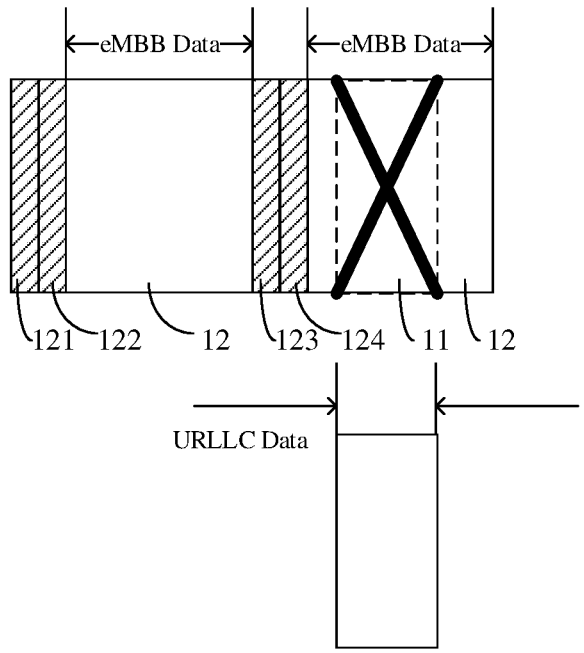
FIG. 1C is another schematic diagram illustrating a transmission resource provided by the embodiment corresponding to FIG. 1A.

As shown in FIG. 1C, assuming that the second data is eMBB data, the eMBB data includes 4 columns of demodulation pilots (as shown by the shaded part in the figure). The first column of demodulation pilots 121 and the second column of demodulation pilots 122 are multiplexed using time-domain orthogonal cover code (OCC), and the third column of demodulation pilots 123 and the fourth column of demodulation pilots 124 are multiplexed using time-domain OCC. The first and second columns of demodulation pilots 121, 122, as well as the third and fourth columns of demodulation pilots 123, 124 are on the second partial resource 12, indicating that all of the second partial resource 12 has corresponding demodulation pilot. Therefore, no data transmission is to be performed on the overlapping first partial resource 11 (as shown by X in the figure), and transmission of eMBB data is performed on all of the non-overlapping second partial resource 12.

Figure 1D:
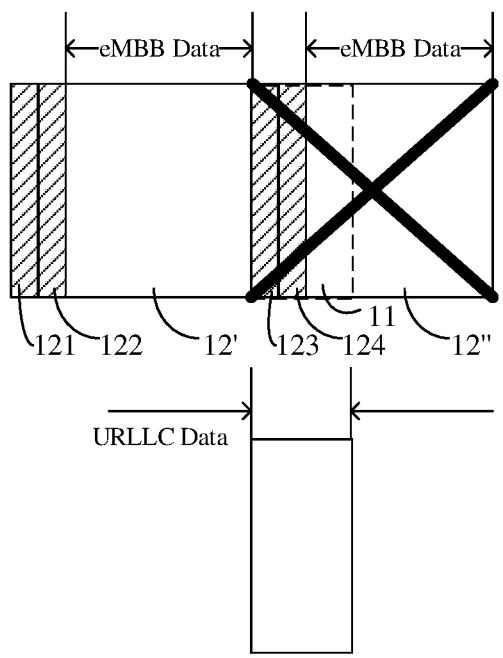
FIG. 1D is another schematic diagram illustrating a transmission resource provided by the embodiment corresponding to FIG. 1A.

As shown in FIG. 1D, assuming that the second data is eMBB data, the eMBB data includes 4 columns of demodulation pilots (as shown by the shaded part in the figure). The first column of demodulation pilots 121 and the second column of demodulation pilots 122 are multiplexed using time-domain orthogonal cover code (OCC), and the third column of demodulation pilots 123 and the fourth column of demodulation pilots 124 are multiplexed using time-domain OCC. The first and second columns of demodulation pilots 121, 122 are on a first part 12' of the second partial resource, indicating that the second partial resource includes demodulation pilots of the eMBB data corresponding to the first and second columns of demodulation pilots 121, 122, that is, this part 12' of the second partial resource has corresponding demodulation pilot. Therefore, the transmission of eMBB data is performed on this part 12' of the second partial resource. The third and fourth columns of demodulation pilots 123, 124 are on the first partial resource 11. Then, since no data transmission is performed on the first partial resource 11, the third and fourth columns of demodulation pilots 123, 124 may need to be dropped, indicating that the second partial resource does not have demodulation pilot of the eMBB data corresponding to the third and fourth columns of demodulation pilots 123, 124, that is, this part 12" of the second partial resource does not have corresponding demodulation pilot. Accordingly, no data transmission is performed on the first partial resource 11 or this part 12" of the second partial resource (as shown by X in the figure).

Figure 1E:
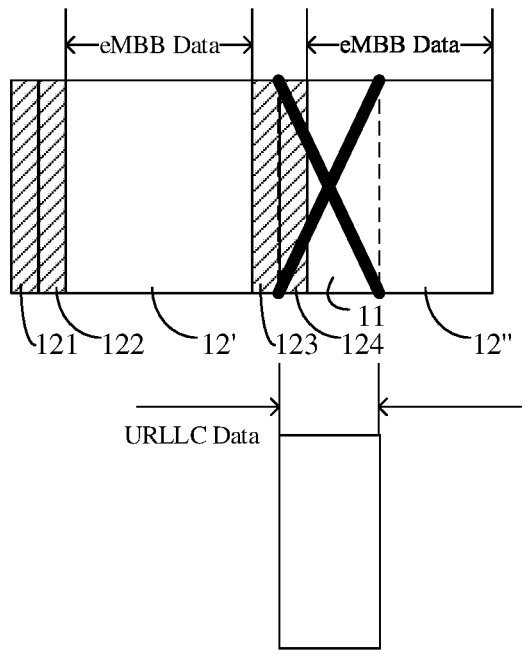
FIG. 1E is another schematic diagram illustrating a transmission resource provided by the embodiment corresponding to FIG. 1A.

As shown in FIG. 1E, assuming that the second data is eMBB data, the eMBB data includes 4 columns of demodulation pilots (as shown by the shaded part in the figure). The first column of demodulation pilots 121 and the second column of demodulation pilots 122 are not multiplexed using time-domain orthogonal cover code (OCC), and the third column of demodulation pilots 123 and the fourth column of demodulation pilots 124 are not multiplexed using time-domain OCC. The first, second and third columns of demodulation pilots 121, 122, 123 are on a first part 12' of the second partial resource, indicating that the second partial resource includes demodulation pilots of the eMBB data corresponding to the first and second columns of demodulation pilots 121, 122, that is, this part 12' of the second partial resource has corresponding demodulation pilot. Therefore, the transmission of eMBB data is performed on this part 12' of the second partial resource. The fourth column of demodulation pilots 124 is on the first partial resource 11. Then, since no data transmission is performed on the first partial resource 11, the fourth column of demodulation pilots 124 may need to be dropped. However, since the third column of demodulation pilots 123 does not depend on the fourth column of demodulation pilots 124, indicating that the second partial resource still includes demodulation pilots of the eMBB data corresponding to the third and fourth columns of demodulation pilots 123, 124, that is, this part 12" of the second partial resource has corresponding demodulation pilot. Therefore, the transmission of the eMBB data can also be performed on this part 12" of the second partial resource, and no data transmission is performed on the first partial resource 11 (as shown by X in the figure).

Figure 1F:
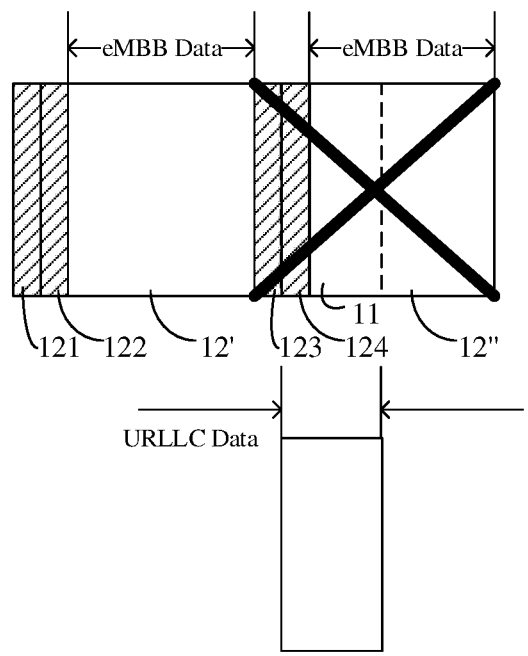
FIG. 1F is another schematic diagram illustrating a transmission resource provided by the embodiment corresponding to FIG. 1A.

As shown in FIG. 1F, assuming that the second data is eMBB data, the eMBB data includes 4 columns of demodulation pilots (as shown by the shaded part in the figure). The first column of demodulation pilots 121 and the second column of demodulation pilots 122 are multiplexed using time-domain orthogonal cover code (OCC), and the third column of demodulation pilots 123 and the fourth column of demodulation pilots 124 are multiplexed using time-domain OCC. The first, second and third columns of demodulation pilots 121, 122, 123 are on a first part 12' of the second partial resource, indicating that the second partial resource includes demodulation pilots of the eMBB data corresponding to the first and second columns of demodulation pilots 121, 122, that is, this part 12' of the second partial resource has corresponding demodulation pilot. Therefore, the transmission of eMBB data is performed on this part 12' of the second partial resource. The fourth column of demodulation pilots 124 is on the first partial resource 11. Then, since no data transmission is performed on the first partial resource 11, the fourth column of demodulation pilots 124 may need to be dropped. However, since the third column of demodulation pilots 123 depends on the fourth column of demodulation pilots 124, indicating that the second partial resource does not include demodulation pilots of the eMBB data corresponding to the third and fourth columns of demodulation pilots 123, 124, that is, this part 12" of the second partial resource has no corresponding demodulation pilot. Therefore, no data transmission is performed on the first partial resource 11 or this part 12" of the second partial resource (as shown by X in the figure).

In another specific implementation process, no data transmission is performed on the second transmission resource corresponding to the at least two pieces of scheduling information.

In another specific implementation process, when the second data uses QPSK modulation or BPSK modulation, the transmission of the second data is performed on the first partial resource of the second transmission resource corresponding to the at least two pieces of scheduling information using a first power, and performed on the second partial resource of the second transmission resource using a second power. In an embodiment, the second power may be a power indicated by corresponding scheduling information, and the first power may be smaller than the power indicated by corresponding scheduling information.

In an embodiment, the first partial resource includes all or part of resource in the second transmission resource that overlaps with the first transmission resource in the time domain; the second partial resource includes all or part of resource in the second transmission resource that does not overlap with the first transmission resource in the time domain.

In this way, by reducing the power to perform transmission of the second data on all or part of resource in the second transmission resources that overlaps with the first transmission resource in the time domain, that is, on the first partial resource, it is possible to perform data transmission by using available transmission resources as much as possible while ensuring correct demodulation, thereby effectively improving system efficiency.

In another specific implementation process, when the second data uses QAM modulation, the transmission of the second data is performed on the second transmission resource corresponding to the at least two pieces of scheduling information using the first power; or no data transmission is performed on the second transmission resource corresponding to the at least two pieces of scheduling information. In an embodiment, the first power may be less than the power indicated by the corresponding scheduling information.

In this way, it is possible to perform data transmission by using available transmission resources as much as possible while ensuring correct demodulation, thereby effectively improving system efficiency.

In this embodiment, the transmission of at least two pieces of scheduling information is performed, and at least two transmission resources corresponding to the at least two pieces of scheduling information partially overlap in time domain, so that data transmission can be performed on at least one of the at least two transmission resources, thereby realizing data transmission when partial transmission resources corresponding to two or more types of data conflict in the time domain at the terminal.

It should be noted that, for the sake of simple description, the foregoing method embodiments are expressed as a series of action combinations, but those skilled in the art should know that the present application is not limited by the sequence of actions described. Because according to the application, certain steps can be performed in other orders or simultaneously. Secondly, those skilled in the art should also know that the embodiments described in the specification are all preferred embodiments, and the actions and modules involved are not necessarily required by the present application.

In the above embodiments, the description of each embodiment has its own emphasis. Any part that is not detailed in an embodiment may refer to related descriptions in other embodiments.

Figure 2:
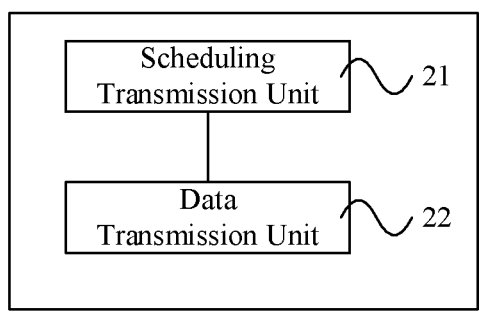
FIG. 2 is a block diagram illustrating a data transmission device according to another embodiment of the present application.

FIG. 2 is a block diagram illustrating a data transmission device according to another embodiment of the present application. As shown in FIG. 2, the data transmission device according to the embodiment may include a scheduling transmission unit 21 and a data transmission unit 22. The scheduling transmission unit 21 is configured to perform transmission of at least two pieces of scheduling information; at least two transmission resources corresponding to the at least two pieces of scheduling information partially overlap in time domain. The data transmission unit 22 is configured to perform data transmission on at least one of the at least two transmission resources.

It should be noted that the data transmission device according to the embodiment may be a terminal or a network device. The embodiment is not limited thereto.

In an embodiment, the transmission resource may include, but not limited to, at least one of a time domain resource, a frequency domain resource, and a power domain resource. The embodiment is not limited thereto.

Optionally, in a possible implementation manner of the embodiment, the data transmission unit 22 is specifically configured to perform transmission of first data on a first transmission resource corresponding to the at least two pieces of scheduling information.

In the implementation manner, the transmitted data may further include second data in addition to the first data. In an embodiment, a service priority of the first data is greater than or equal to a service priority of the second data.

In a possible implementation manner of the embodiment, the data transmission unit 22 may be specifically configured to perform no data transmission on a first partial resource of a second transmission resource corresponding to the at least two pieces of scheduling information, and perform transmission of second data on a second partial resource of the second transmission resource.

In an embodiment, the first partial resource may include, but not limited to, all or part of resource in the second transmission resource that overlaps with the first transmission resource in the time domain; the second partial resource may include, but not limited to, all or part of resource in the second transmission resource that does not overlap with the first transmission resource in the time domain.

For example, the data transmission unit 22 may be specifically configured to: perform transmission of the second data on all of the second partial resource when the all of the second partial resource has corresponding demodulation pilot; perform transmission of the second data on part of the second partial resource when the part of the second partial resource has corresponding demodulation pilot; perform no data transmission on part of the second partial resource when the part of the second partial resource does not have corresponding demodulation pilot; perform no data transmission on all of the second partial resource when the all of the second partial resource does not have corresponding demodulation pilot.

In another possible implementation manner of the embodiment, the data transmission unit 22 may be specifically configured to perform no data transmission on the second transmission resource corresponding to the at least two pieces of scheduling information.

In another possible implementation manner of the embodiment, the data transmission unit 22 may be specifically configured to, when the second data uses QPSK modulation or BPSK modulation, perform transmission of the second data on the first partial resource of the second transmission resource corresponding to the at least two pieces of scheduling information using a first power, and perform transmission of the second data on the second partial resource of the second transmission resource using a second power.

In an embodiment, the first partial resource may include, but not limited to, all or part of resource in the second transmission resource that overlaps with the first transmission resource in the time domain; the second partial resource may include, but not limited to, all or part of resource in the second transmission resource that does not overlap with the first transmission resource in the time domain.

In another possible implementation manner of the embodiment, the data transmission unit 22 may be specifically configured to, when the second data uses QAM modulation, perform transmission of the second data on the second transmission resource corresponding to the at least two pieces of scheduling information using the first power; or perform no data transmission on the second transmission resource corresponding to the at least two pieces of scheduling information.

It should be noted that the methods in the embodiments corresponding to FIG. 1A to FIG. 1F may be implemented by the network device provided in this embodiment. For a detailed description, reference may be made to related content in the embodiments corresponding to FIG. 1A to FIG. 1F, and details are not described herein again.

In this embodiment, the transmission of at least two pieces of scheduling information are performed by the scheduling transmission unit, and at least two transmission resources corresponding to the at least two pieces of scheduling information partially overlap in time domain, so that data transmission can be performed by the data transmission unit on at least one of the at least two transmission resources, thereby realizing data transmission when partial transmission resources corresponding to two or more types of data conflict in the time domain at the terminal.

Those skilled in the art can clearly understand that for the convenience and conciseness of the description, the specific working process of the system, device, and unit described above can refer to the corresponding process in the foregoing method embodiments, which will not be repeated here.

In the several embodiments provided by the present application, it should be understood that the disclosed system, device, and method may be implemented in other ways. For example, the device embodiments described above are only schematic. For example, the division of the units is only a logical function division. In actual implementation, there may be another division manner, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units. In other words, they may be located in one place, or may be distributed at multiple network units. Some or all of the units may be selected according to actual needs to achieve the purpose of the solution of this embodiment.

In addition, each functional unit in each embodiment of the present application may be integrated into one processing unit, or each unit may exist alone physically, or two or more units may be integrated into one unit. The above integrated unit can be implemented in the form of hardware, or in the form of hardware plus software functional units.

Finally, it should be noted that the above embodiments are only used for illustrating the technical solutions of the present application without limitation. Although the present application has been described in detail with reference to the foregoing embodiments, persons of ordinary skill in the art should understand that the technical solutions described in the foregoing embodiments may be further modified, or some of the technical features may be equivalently replaced; and these modifications or replacements do not deviate from the spirit and scope of the technical solutions according to the embodiments of the present application.

What is claimed is:

1. A data transmission method, comprising:
receiving, by a terminal, at least two scheduling messages from a network device; wherein at least two transmission resources correspond to the at least two scheduling messages, and the at least two transmission resources comprise a first transmission resource and a second transmission resource partially overlapping in time domain; and
performing data transmission on at least one of the at least two transmission resources,
wherein the performing data transmission on at least one of the at least two transmission resources comprises:
performing transmission of first data on the first transmission resource; and
performing no data transmission on a first partial resource, overlapping with the first transmission resource, of the second transmission resource, and performing transmission of second data on a second partial resource, not overlapping with the first transmission resource, of the second transmission resource,
wherein the performing transmission of the second data on the second partial resource comprises:
determining, by the terminal, whether the part of the second partial resource has corresponding demodulation pilot used for demodulating the second data;
performing transmission of the second data on part of the second partial resource in response to determining that the part of the second partial resource has corresponding demodulation pilot used for demodulating the second data; and
performing no data transmission on all of the second partial resource in response to determining that the all of the second partial resource does not have corresponding demodulation pilot.

2. The method according to claim 1, wherein the data refers to information that needs to be transmitted between the terminal and the network device.

3. The method according to claim 2, wherein the data is carried on at least one of a physical uplink shared channel (PUSCH) and a physical uplink control channel (PUCCH).

4. The method according to claim 1, wherein the transmission resource comprises at least one of a time domain resource, a frequency domain resource, or a power domain resource.

5. The method according to claim 1, wherein a service priority of the first data is greater than or equal to a service priority of the second data.

6. A data transmission device, comprising a memory, a processor and a communication interface, wherein the memory is configured to store instructions, and the processor, when executing the instructions stored in the memory, is configured to trigger the communication interface to:
receive at least two scheduling messages from a network device; wherein at least two transmission resources correspond to the at least two scheduling messages, and the at least two transmission resources comprise a first transmission resource and a second transmission resource partially overlapping in time domain; and
perform data transmission on at least one of the at least two transmission resources,
wherein the processor is specifically configured to trigger the communication interface to:
perform transmission of first data on the first transmission resource; and
perform no data transmission on a first partial resource, overlapping with the first transmission resource, of the second transmission resource, and perform transmission of second data on a second partial resource, not overlapping with the first transmission resource, of the second transmission resource,
wherein the performing transmission of the second data on the second partial resource comprises:
determining, by the terminal, whether the part of the second partial resource has corresponding demodulation pilot used for demodulating the second data;
performing transmission of the second data on part of the second partial resource in response to determining that the part of the second partial resource has corresponding demodulation pilot used for demodulating the second data; and
performing no data transmission on all of the second partial resource in response to determining that the all of the second partial resource does not have corresponding demodulation pilot.

7. The device according to claim 6, wherein the data refers to information that needs to be transmitted between a terminal and the network device.

8. The device according to claim 7, wherein the data is carried on at least one of a physical uplink shared channel (PUSCH) and a physical uplink control channel (PUCCH).

9. The device according to claim 6, wherein the transmission resource comprises at least one of a time domain resource, a frequency domain resource, or a power domain resource.

10. The device according to claim 6, wherein a service priority of the first data is greater than or equal to a service priority of the second data.

11. A non-transitory computer-readable storage medium, storing a computer program, wherein the computer program causes a terminal device to:
receive at least two scheduling messages from a network device; wherein at least two transmission resources correspond to the at least two scheduling messages, and the at least two transmission resources comprise a first transmission resource and a second transmission resource partially overlapping in time domain; and
perform data transmission on at least one of the at least two transmission resources,
wherein the processor is specifically configured to trigger the communication interface to:
perform transmission of first data on the first transmission resource; and
perform no data transmission on a first partial resource, overlapping with the first transmission resource, of the second transmission resource, and perform transmission of second data on a second partial resource, not overlapping with the first transmission resource, of the second transmission resource,
wherein the performing transmission of the second data on the second partial resource comprises:
determining, by the terminal, whether the part of the second partial resource has corresponding demodulation pilot used for demodulating the second data;
performing transmission of the second data on part of the second partial resource in response to determining that the part of the second partial resource has corresponding demodulation pilot used for demodulating the second data; and
performing no data transmission on all of the second partial resource in response to determining that the all of the second partial resource does not have corresponding demodulation pilot.

* * * * *